Sept. 22, 1931.  A. A. ACKERMAN ET AL  1,823,881
CENTRIFUGAL CLUTCH
Filed Nov. 27, 1929

Witnesses.
Geo Wright
John F. Heine

Inventor
Albert A. Ackerman
and Charles L. Thomson
By Henry J. Miller
Attorney

Patented Sept. 22, 1931

1,823,881

UNITED STATES PATENT OFFICE

ALBERT A. ACKERMAN, OF WESTFIELD, AND CHARLES L. THOMSON, OF NEWARK, NEW JERSEY, ASSIGNORS TO THE SINGER MANUFACTURING COMPANY, OF ELIZABETH, NEW JERSEY, A CORPORATION OF NEW JERSEY

CENTRIFUGAL CLUTCH

Application filed November 27, 1929. Serial No. 410,053.

This invention relates to clutches of the type which operates automatically, under centrifugal force, when the driving member attains a predetermined speed, to pick up the driven member and the load connected to it.

An object of the invention is to provide a centrifugal clutch which is light in weight, simple in construction and inexpensive to manufacture. The invention seeks to avoid the use of separate and specially provided weights for effecting the operation of the clutch under centrifugal force, as these add to the weight and cost of the clutch.

The invention aims to provide a centrifugal clutch-linkage which is particularly effective, so that the use of specially constructed and weighted parts is ordinarily not required.

To the attainment of the ends in view, the driving clutch-member is provided with two diametrically opposed, pivotally mounted, expanding shoes, the length of each of which is preferably about one quarter of the circumference of the driven clutch-drum. Pivoted on the driving member, preferably coaxially with the clutch-shoe pivots, are a pair of toggle-links which are connected by their respective companion toggle-links to the free ends of the clutch-shoes. The lengths of the links are such that, when the clutch-shoes are expanded into driving engagement with the cylindrical drum constituting the driven clutch-member, the links are at an obtuse angle to one another, the obtuseness of which is sufficient to provide an effective toggle action, forcing the clutch-shoes into driving engagement with the drum. It has been found in practice that, with a linkage of this nature, it is unnecessary to specially weight the clutch-shoes or the toggle-links. They are heavy enough, as ordinarily made, to provide a considerable driving torque without slippage.

Figure 1:
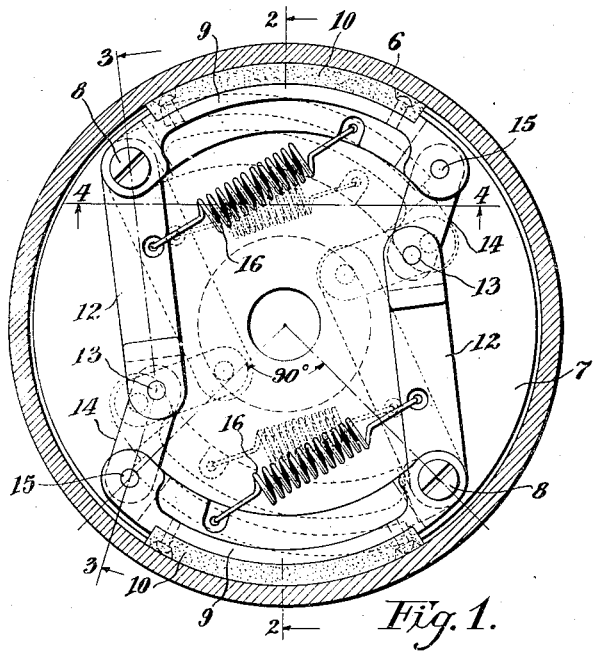
Figure 3:
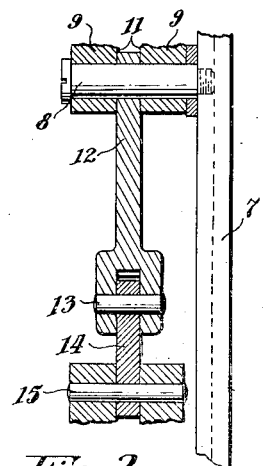
Figure 4:
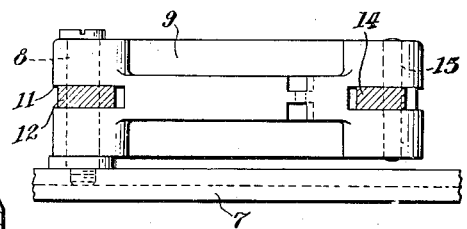
Figure 2:
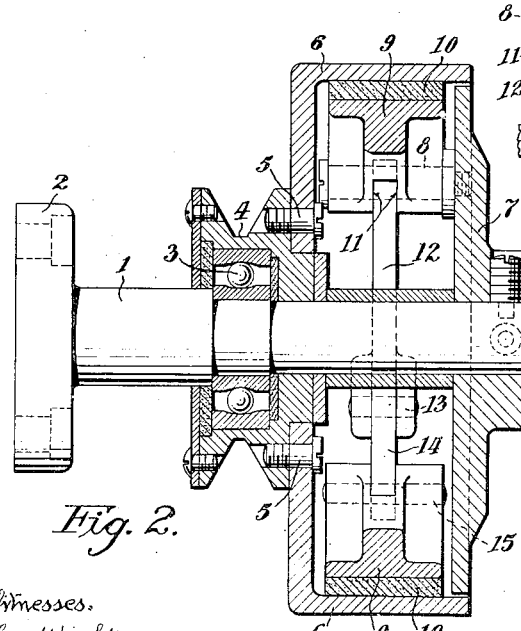

In the accompanying drawings, Fig. 1 is a section through the clutch-drum, taken transversely of the clutch-axis, showing the driving shoes and centrifugally operated linkage in elevation. Fig. 2 is a section through the clutch taken on the line 2—2, Fig. 1. Fig. 3 is a section on the line 3—3, Fig. 1, and Fig. 4 is a section on the line 4—4, Fig. 1.

According to the invention, in the embodiment illustrated, 1 represents a driving shaft having at one end a flange 2, adapting it to be connected to or mounted on the shaft or driving member of an electric motor or other source of power. Journaled on the shaft 1, by means of the ball-bearing 3, is the driven clutch-member comprising a V-pulley 4 to one side face of which is fixed by screws 5 the drum 6.

Fixed to the shaft 1 is the driving clutch-member comprising a disk 7 which substantially closes the open end of the drum 6 and carries the diametrically opposed pivot screws 8 for the clutch-shoes 9 which are preferably faced at 10 with leather or other suitable friction material.

Pivoted on the screws 8, in the slots 11 provided at the pivoted ends of the clutch-shoes 9, are the relatively long links 12 which are pivotally connected at 13 to the relatively short links 14 which are pivoted at 15 to the slotted free ends of the clutch-shoes 9. Springs 16 connected at their opposite ends, each to a link 12 and adjacent clutch-shoe 9, exert contractile forces on the clutch-linkages which hold the parts in their dotted line positions, Fig. 1, when the shaft 1 is at rest.

When the driving or motor shaft 1 is started, it carries no load except the relatively light weight of the clutch parts mounted on the disk 7. As the speed of the shaft 1 increases, the centrifugal forces exerted upon the parts 9, 12 and 14 are increased, and, when the shaft 1 reaches a certain critical speed, dependent upon the weights of the parts and strengths of the springs 16, the centrifugal forces will overcome the contractile forces of the springs 16 and the clutch-linkages will expand to driving or full line position, Fig. 1, in which position the links 12, 14, which constitute toggle-links, stand at an obtuse angle and exert powerful expansive forces upon the clutch-shoes 9 without the necessity of using specially weighted parts.

The invention is not to be understood as limited exactly to the form and arrangement of parts shown and described as it is obviously susceptible of modification within the spirit of the invention defined in the claims. The angular length of 90° of the clutch-shoes is not a precise or hard and fast requirement. Approximately this length is preferred, as it permits the toggle-links to be made long enough to be centrifugally effective without the necessity of specially weighting such links, or providing them with weighted lever-extensions.

Having thus set forth the nature of the invention, what we claim herein is:—

1. In a centrifugal clutch, a cylindrical driven drum, a driving disk, diametrically opposed clutch-shoes pivotally mounted on said disk, toggle-links pivotally connecting the pivot-point of a respective clutch-shoe to the free end of the other clutch-shoe, said clutch-shoes each having a length between its end-pivots of about one quarter of the circumference of the clutch-drum, and spring means for contracting said clutch-shoes and toggle-links.

2. In a centrifugal clutch, a cylindrical driven drum, a driving disk, diametrically opposed clutch-shoes pivotally mounted on said disk, toggle-links pivotally connecting the pivot-point of a respective clutch-shoe to the free end of the other clutch-shoe, said clutch-shoes each having a length between its end-pivots of about one quarter of the circumference of the clutch-drum, and springs each anchored at its opposite ends to a respective clutch-shoe and to the toggle-link pivoted coaxially with it.

3. In a centrifugal clutch, a cylindrical driven member, a driving disk, diametrically opposed clutch-shoes pivotally mounted on said disk, relatively long toggle-links each pivoted coaxially with a respective clutch-shoe at a fixed point on said disk, and relative short toggle-links each connecting its respective relatively long companion toggle-link to the free end of a respective one of said clutch-shoes.

In testimony whereof, we have signed our names to this specification.

ALBERT A. ACKERMAN.
CHARLES L. THOMSON.